United States Patent [19]
Barriuso et al.

[11] Patent Number: 5,535,365
[45] Date of Patent: Jul. 9, 1996

[54] METHOD AND APPARATUS FOR LOCKING SHARED MEMORY LOCATIONS IN MULTIPROCESSING SYSTEMS

[75] Inventors: Frank R. Barriuso, Apple Valley; Douglas M. Pase, Burnsville; David J. Sielaff, St. Paul, all of Minn.

[73] Assignee: Cray Research, Inc., Eagan, Minn.

[21] Appl. No.: 141,259

[22] Filed: Oct. 22, 1993

[51] Int. Cl.⁶ .................................................... G06F 12/00
[52] U.S. Cl. ........................ 395/482; 395/479; 395/726; 395/421.06; 395/472; 364/DIG. 1; 364/246.11; 364/246.8
[58] Field of Search .............................. 364/200 MS File, 364/900 MS File; 395/425, 421.06, 472, 479, 482, 726

[56] References Cited

U.S. PATENT DOCUMENTS

| | | | |
|---|---|---|---|
| 4,584,644 | 4/1986 | Larner | 395/650 |
| 4,977,498 | 12/1990 | Rastegar et al. | 395/455 |
| 5,027,316 | 6/1991 | Frantz et al. | 395/831 |
| 5,093,912 | 3/1992 | Dong et al. | 395/650 |
| 5,237,668 | 8/1993 | Blandy et al. | 395/402 |
| 5,261,106 | 11/1993 | Lentz et al. | 395/726 |
| 5,265,245 | 11/1993 | Nordstrom et al. | 395/600 |
| 5,327,570 | 7/1994 | Foster et al. | 395/800 |

FOREIGN PATENT DOCUMENTS 58-165166  9/1983  Japan .

OTHER PUBLICATIONS

John M. Mellor–Crummey, et al., "Algorithms for Scalable Synchronization on Shared–Memory Multiprocessors", *ACM Transactions on Computer Systems*, vol. 9, No. 1, pp. 21–65 (Feb., 1991).

John L. Hennessy, et al., "Computer Organization and Design: the Hardware/Software Interface," Morgan Kaufmann Publishers, Inc., pp. 612–616 (1994).

Thomas E. Anderson, "The Performance of Spin Lock Alternatives for Shared–Memory Multiprocessors," *IEEE Transactions of Parallel and Distributed Systems*, vol. 1, No. 1 pp. 6–16 (Jan., 1990).

Primary Examiner—Matthew M. Kim
Attorney, Agent, or Firm—Schwegman, Lundberg, Woessner & Kluth

[57] ABSTRACT

A method of synchronizing accesses to shared data in a multiprocessing system having an atomic swap capability. A distinguished lock value is defined. A processor which wishes to access a shared data memory location performs an atomic swap of the lock value to the shared data memory location. If the data received from the atomic swap is equivalent to the lock value the processor knows that the memory location has been locked by another processor. The processor then repeats the atomic swap at intervals until data is received which is not equivalent to the lock value. The processor operates on the data and then performs a write to the shared data memory location to replace the lock value with the updated data. In an alternate embodiment, in situations where a unique lock value cannot be defined, an array is created to store lock values associated with particular shared data memory locations. A processor seeking access to a shared data memory location performs atomic swaps of the lock value to the lock array to determine access to a shared data memory location.

5 Claims, 5 Drawing Sheets

METHOD AND APPARATUS FOR LOCKING SHARED MEMORY LOCATIONS IN MULTIPROCESSING SYSTEMS

BACKGROUND OF THE INVENTION

1. Field of the Invention

The present invention pertains to the field of high speed digital data processors and, more particularly, to a method of synchronizing access to shared data in a multiprocessor system.

2. Background Information

Communication costs are an important factor in the efficiency of multiprocessor data processing systems. In systems with large numbers of processors, such as massively parallel architectures, communication costs can be of critical importance. Communication costs arise not only from the time required for a single communication but also from the number of interprocessor communications required to synchronize processors sharing data. It is therefore important in a multiprocessor system to minimize both the cost of a single communication and the number of communications.

It is well-known in the art to use a lock mechanism to synchronize processors sharing data. A lock mechanism restricts access to a shared data memory location by access to the location unless the processor has access rights. In one well-known lock mechanism, a semaphore bit is used to protect each shared data memory location. In such a system, a logic "one" written to the semaphore bit is a signal to other processors that data at the protected memory location is being modified. Before attempting access, a processor will read the semaphore bit for a desired shared data memory location. If the bit is set, the processor waits until the semaphore bit is cleared. Once the bit is cleared, the processor sets the semaphore bit and accesses the shared data memory location. After the processor finishes updating the memory location with a new value, the semaphore bit is cleared to allow access to the data by other processors.

The use of semaphores increases communication costs by requiring at least two memory references for each shared data memory access, one to the semaphore memory and one to the shared data memory location. In large-scale or massively parallel multiprocessor system, this communication overhead can be prohibitively expensive. For instance, in shared memory multiprocessing systems based on either k-ary n-cubes (or in networks such as rings, meshes, tori, binary n-cubes and Omega networks which are isomorphic to k-ary n-cubes) where memory access time increases with the number of node connections between the requesting processor and the memory on any particular node, doubling the number of references needed to retrieve the contents of a memory location can result in unacceptable delay. Processors in this class of topologies communicate via a message passing protocol in which information intended for a distant processor is packetized and routed through intermediate processors to the destination processor. Therefore, a memory request must pass through a series on nodes on the way to the memory location and the memory data must repeat the journey in reverse to complete the transaction. The requirement of two such transactions for each shared data access is unacceptable.

It is clear that there is a need for a method of synchronizing accesses to shared data in a multiprocessing system which reduces the communication overhead associated with semaphore controlled systems.

SUMMARY OF THE INVENTION

The present invention is a method of synchronizing accesses to shared data in a multiprocessing system having an atomic swap capability. According to the method, a lock value is defined. A processor which wishes to access a shared data memory location performs an atomic swap of the lock value to the shared data memory location. In an atomic swap, a memory location is read and a new value written to that location within a single indivisible operation. If the data received from the atomic swap is equivalent to the lock value the processor knows that the memory location has been locked by another processor. The processor then repeats the atomic swap at intervals until data is received which is not equivalent to the lock value. The processor operates on the data and then performs a write to the shared data memory location to replace the lock value with the updated data.

According to another aspect of the present invention, in situations where a unique lock value cannot be defined, an array is created to store lock values associated with particular shared data memory locations. A processor seeking access to a shared data memory location performs atomic swaps of the lock value to the lock array. When the atomic swap returns a value other than the lock value, the processor has permission to access the shared data memory location. Hashing is used to minimize the size of the lock array.

DETAILED DESCRIPTION OF THE PREFERRED EMBODIMENT

In the following detailed description of the preferred embodiment, references are made to the accompanying drawing which form a part thereof, and in which are shown by way of illustration a specific embodiment in which the invention may be practiced. It is to be understood that other embodiments may be utilized and structural changes may be made without departing from the scope of the present invention.

Figure 1:
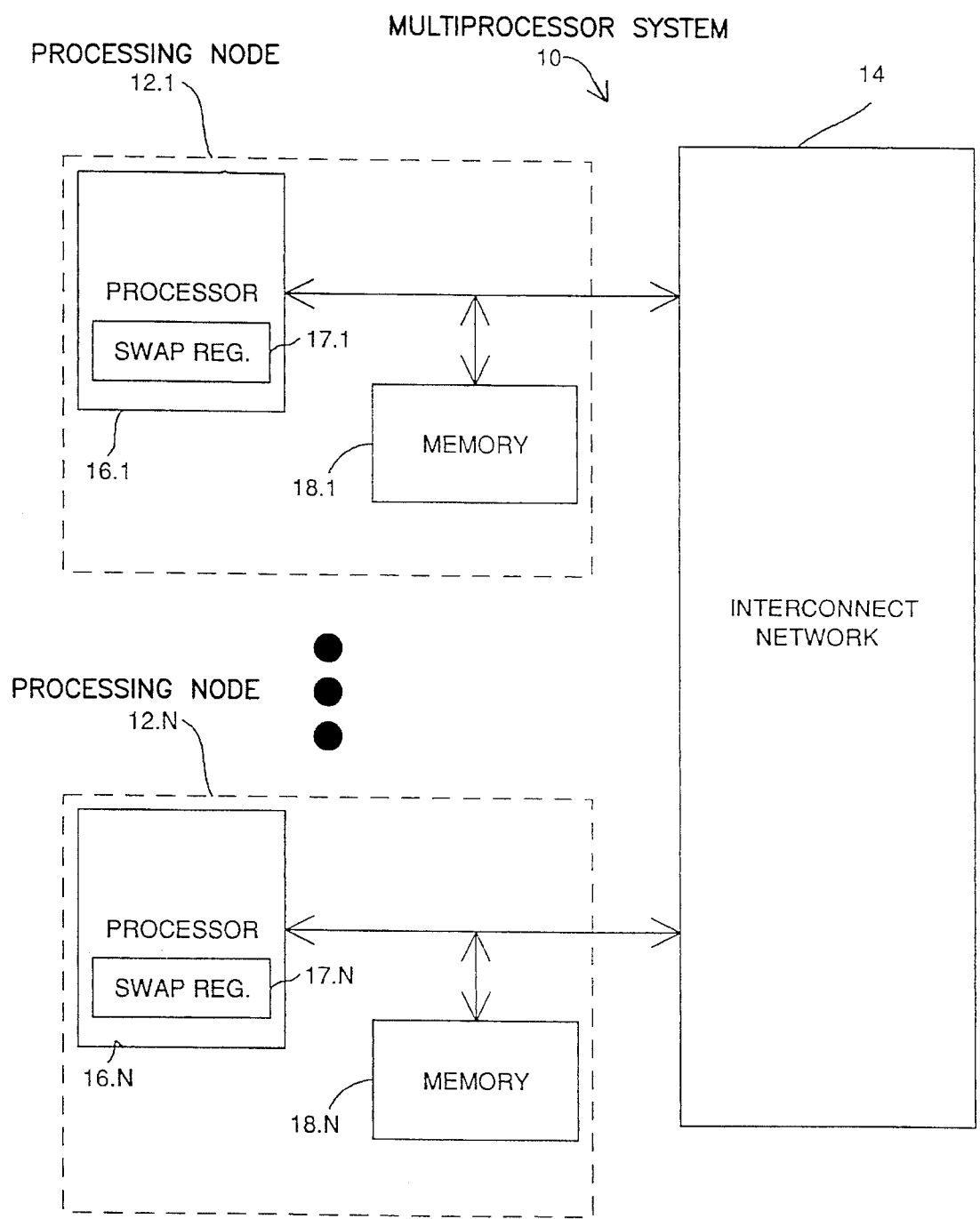
FIG. 1 is a functional block diagram of a multiprocessing system.

FIG. 1 is a functional block diagram of a multiprocessor system 10. In a computer such as system 10 processing nodes 12.1 through 12.N are connected over an interconnect network 14 to other processing nodes 12. Each processing node 12 includes a processor 16 and a memory 18. Memory 18 is mapped to a global memory address. Each processor 16 includes a swap register 17.

Atomic Swap

Processor 16 is capable of performing atomic swap operations to any of the memories 18. In an atomic swap operation a processor 16 reads a memory location in memory 18 and writes a new value to that location in a single, indivisible operation. The basic operation acts as a load and store to any memory location, local or remote. The data at that location is returned to processor 16 as a conventional load; in the memory cycle after the read cycle, the write data from processor 16 is, in turn, written to the memory location. Such an operation is critical to prevent access to that location between the time the data is read and the lock value written.

In one embodiment, each processor 16 includes a swap register 17 which is used to store the value to be swapped into the desired memory location. For processors which do not support a swap instruction in the architecture or instruction set, the swap function is implemented, as described below, in an external memory-mapped register 20 and the swap operation is initiated by load instructions from specially marked pages of memory. Such an embodiment is illustrated generally in FIG. 4.

Atomic Update

An atomic update is a read from a shared data memory location which takes advantage of the atomic swap operation to implement a lock mechanism within the memory location itself. Atomic updates can be advantageously used to allow parallel execution of loops such as loops of the form:

```
do i = 1, n
    a(ix(i)) = a(ix(i)) <op> <expr>
enddo
``` where <op> is an associative, commutative binary operator. The expression <expr> must not have any cross iteration dependencies but the array ix may have one or more repeated values. In such loops, parallel execution of the I loop, combined with repeated value(s) in the ix array create the potential for race conditions, which must be resolved through some form of synchronization. In the system described, the atomic update method is the preferred form of synchronization.

In one embodiment, in an atomic update a single read operation is used not only to determine the contents of the memory location but also to determine the lock status of that memory location. This duality of function reduces the communication cost in performing a locked memory read. In one embodiment of the atomic update method, a single swap operation is used to read the contents of a shared data memory location and replace those contents with a lock value. Subsequent reads of that location receive the lock value, informing the reading processor 16 that the location is locked. The rebuffed processor 16 then repeats the swap instruction until a non-lock value number is read.

In such an embodiment, the lock value must be a distinguished value, that is, a value which will never occur in normal operation. An example of such a distinguished value is the use of NaN or Inf for arrays of IEEE floating point numbers. For example, in operations on arrays of IEEE floating point numbers, the lock value may be set to Inf (or, in another embodiment, to NaN) and memory locations in the array are treated as locked when a swap to a memory location a(ix(i)) results in the return of Inf. In integer operations, a distinguished lock value may include such numbers as the largest negative integer. In either case, care must be taken to ensure that the distinguished value chosen will not occur in the normal course of computation.

It should be noted that the distinguished value used by any particular process can change from process to process; each process can, if desired, select the best approach to ensuring that a value selected as the distinguished value will not occur in normal operation.

An example of an atomic update procedure which uses a distinguished value as a lock value is described next. At initialization, each processor 16 operating on a shared data memory location writes the appropriate lock value to its swap register 17. When it comes time for a particular processor 16 to access the shared data memory location, that processor 16 then initiates an atomic swap operation which places the contents of the local swap register 17 in the desired memory location in a memory 18 while placing the pre-swap contents of that memory location in a local memory location in local memory 18 or in a local register (not shown). If the local memory location or register contains the lock value after the atomic swap operation, the desired memory location is inaccessible. Processor 16 then waits for a period of time before executing a new swap operation. Eventually, a second processor 16 writes an updated value to the shared data memory location, thereby replacing the lock value. The next swap operation by a processor 16 returns a number other than the lock value. That processor 16 operates on the returned value and saves it back to the original memory location, clearing the lock value and permitting access to that location by other processors 16.

In one embodiment, the contents of swap register 17 are replaced with the pre-swap contents of the shared data memory location. Swap register 17 can then be read by its processor 16 to determine the lock status of the memory location. Such an approach has the drawback of requiring that the lock value must be written to swap register 17 at the start of each atomic update operation to ensure a proper lock.

Figure 2:
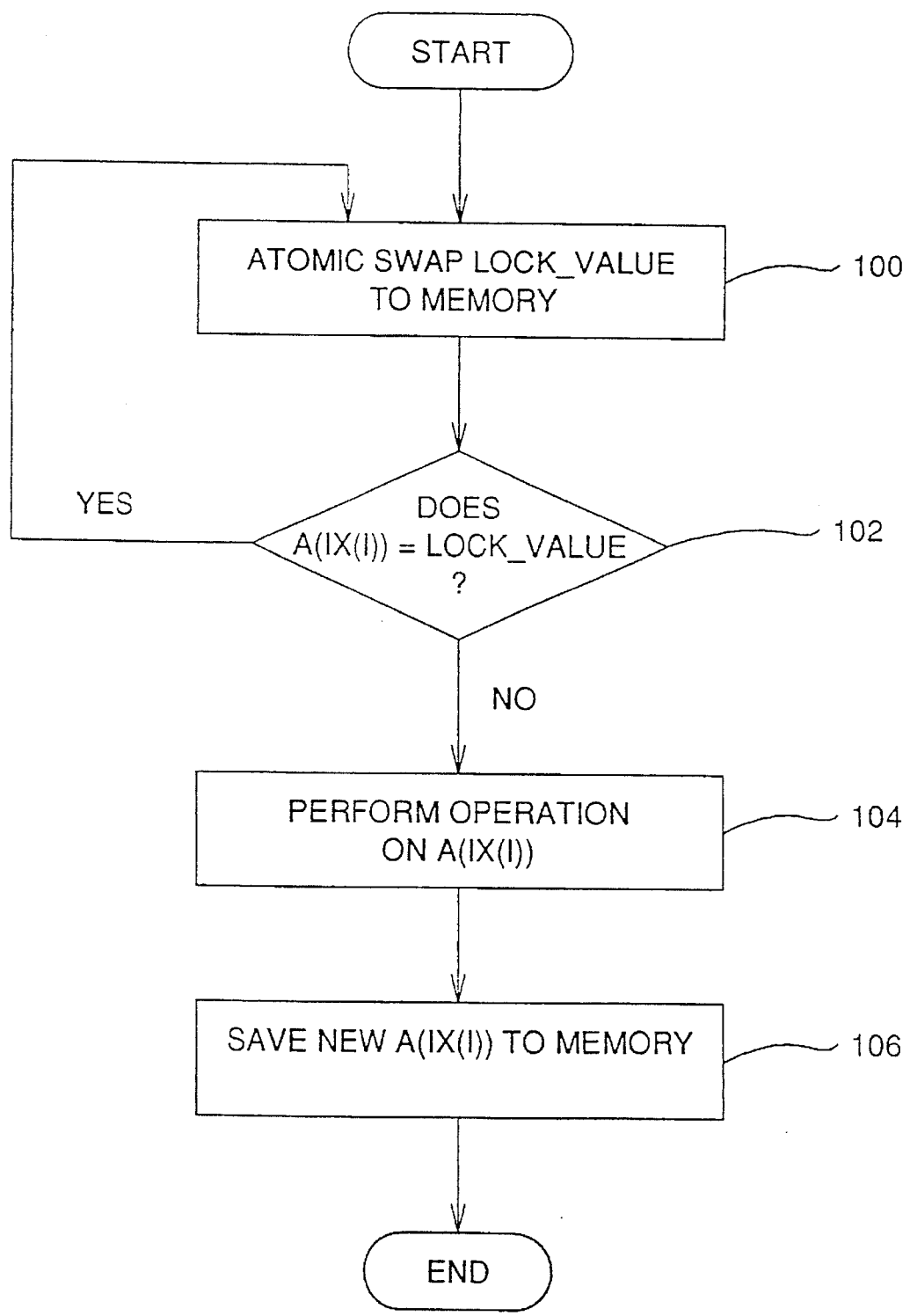
FIG. 2 is a flow diagram representation of the steps taken in accessing a shared data memory location according to the present invention.

One embodiment of the steps taken by a processor 16 in executing an atomic update is illustrated generally in FIG. 2. In FIG. 2, a processor 16, at 100, performs an atomic swap of the contents of its swap register 17 to a remote memory location a(ix(i)). The atomic swap operation transfers the contents of the swap register 17 (previously initialized to the lock value) as a packet through interconnect network 14 to a remote memory 18. The swap operation packet causes a remote node 12 associated with the desired remote memory 18 to read the contents of the desired memory location in memory 18 and to replace the contents of that memory location with the lock value. The remote node 12 then creates and transfers to requesting processor 16 a response packet which contains the contents of a(ix(i)).

At 102, processor 16 determines if the data received from the swap operation read of the desired memory location is the lock value. If so, the desired location is locked. Processor 16 then waits some interval before executing another swap operation at 100.

If, at 102, the swap operation read of the desired memory location returns a value other than the lock value, the swap operation read was successfully completed and processor 16 moves to 104 to operate on the contents of a(ix(i)). After the operation, processor 16, at 106, writes the result of the operation on the contents of a(ix(i)) to a(ix(i)) as a simple write operation, replacing the lock value and freeing up access to a(ix(i)) to other processors 16. The steps illustrated in FIG. 2 could be implemented as program code in local memory 18 associated with processor 16. An arbitration mechanism is not needed for this operation to work properly. It should be obvious that, lacking an arbitration mechanism, accesses to a shared data memory location occur on a first come, first served manner.

By way of example, three processors (16.1 through 3, respectively) wish to access a single memory location in a memory 18.4. The memory location is part of a page of memory configured as an IEEE floating point number. In this example, processors 16.1 through 16.3 each request the same memory location at the same time by issuing swap operation packets including a lock value. The swap operation packets are transferred across interconnect network 14 to remote memory 18.4. In this example, the swap operation packet issued by processor 16.2 reaches remote memory 18.4 first. Therefore, the contents of the memory location is formed into a packet to be sent back to processor 16.2 and the lock value from the swap operation packet from processor 16.2 is written into the memory location.

Some time later, the swap operation packet from processor 16.1 reaches remote memory 18.4. The contents of the memory location (the lock value written by processor 16.2) is placed in a return packet and sent to processor 16.1, and the lock value in the swap operation packet sent by processor 16.1 is written to the memory location (with no net change). Likewise, at some later time, a similar transfer occurs with the swap operation packet from processor 16.3. Each of the processors 16.1 through 16.3 therefore receive a return packet from the memory location at memory 18.4. Each processor 16.1 through 16.3 examines the contents of the return packet. If the return packet contents equal the lock value, the processor 16 knows that it has been locked out of the transfer. The rebuffed processors 16 then repeat the atomic swap operation at some later time. In the meantime, processor 16.2, which has the actual contents of the memory location in remote memory 18.4, operates on that data and develops an updated value. The updated value is then written back into the memory location in remote memory 18.4. A subsequent swap operation by either processor 16.1 or processor 16.3 results in a valid read and that processor can continue. The process continues until all processors have completed a valid read and update.

A compiler can be constructed which automatically replaces code of an iterative loop having the form shown above with atomic update code of the form:

```
do i = 1, n
    do
        temp = atomic_swap(a(ix(i)), lock_value)
    while (temp .eq. lock_value)
    a(ix(i)) = a(ix(i)) <op> <expr>
enddo
```

For situations where it is impossible to select a distinguished value for use as a lock value, the present invention provides an alternative lock mechanism. In such situations, a second array is allocated within a memory 18 to lock locations in array 'a'. Although the original array 'a' may be quite large, the second array is usually allocated significantly fewer memory locations; hashing is used to determine which location in the smaller array should hold the lock for a given element. For example, if 'a(ix(i))' is to be updated, 'lock(hash(ix(i)))' is used as the locking element, where lock( ) is the hash table and hash( ) is the hash value calculated through a hashing function.

Figure 3:
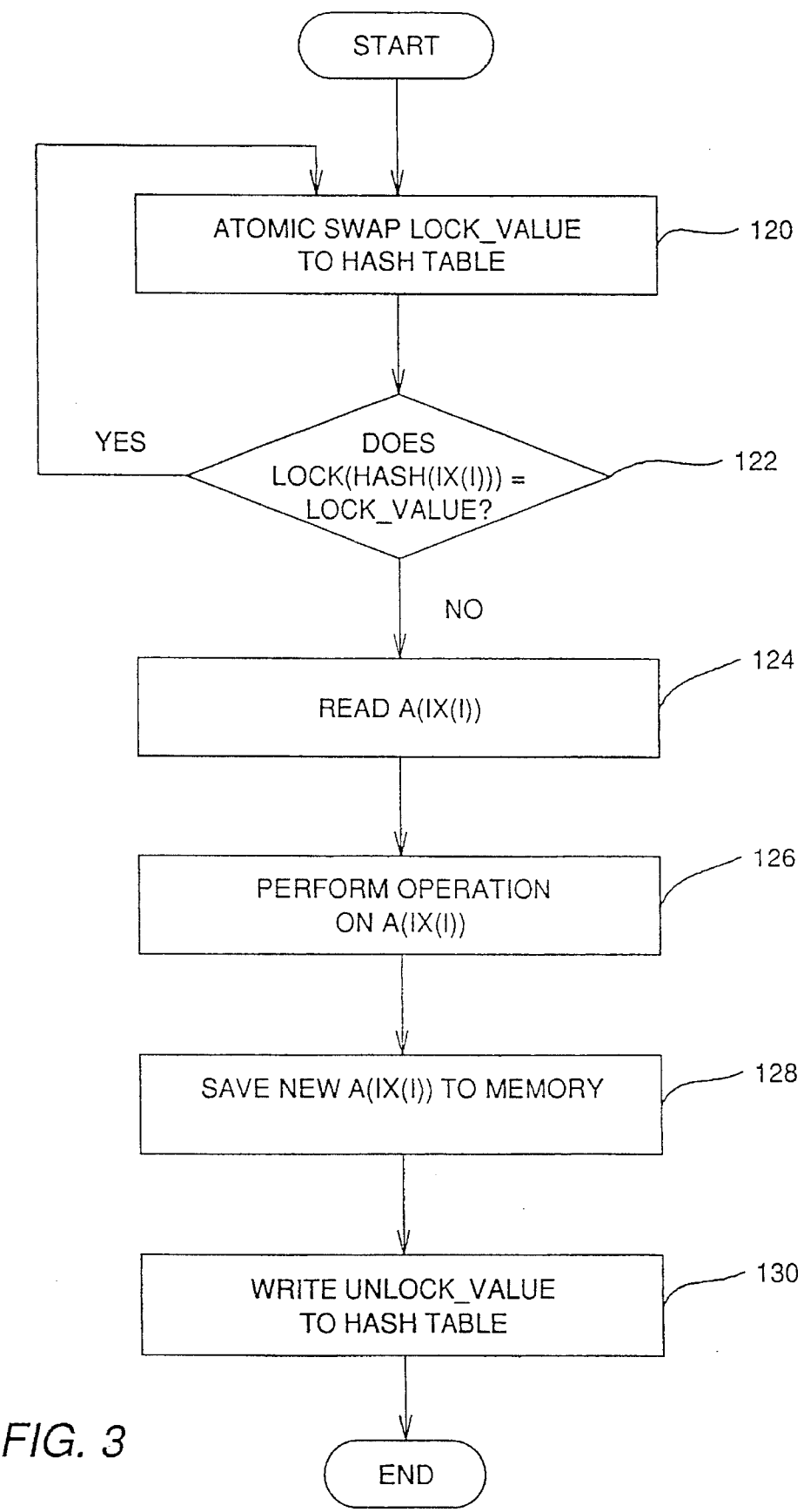
FIG. 3 is a flow diagram representation of an alternate method of accessing a shared data memory location according to the present invention.

One embodiment of the steps taken in executing such an atomic update is illustrated generally in FIG. 3. In FIG. 3, a processor 16, at 120, performs an atomic swap of the contents of swap register 17 to the hash table. The atomic swap operation transfers the contents of the swap register (previously initialized to, for instance, a logic one) to a local memory 18 or through interconnect network 14, as a packet, to a remote memory 18. If the hash table is in remote memory 18, the swap operation packet causes a remote node 12 associated with the desired remote memory 18 to read the contents of the desired hash table memory location in memory 18 and to replace the contents of that memory location with the lock value contained in the swap operation packet. The remote node 12 then creates and transfers to requesting processor 16 a response packet which contains the contents of the desired hash table memory location.

If the hash table is in local memory 18, the local processor 16 performs a swap operation to the local memory location, replacing the contents of that location with the swap register contents and loading the pre-swap contents into a register (not shown) of processor 16.

At 122, processor 16 determines if the data received from the swap operation read of the hash table memory location is the lock value (in this case, logic one). If so, the desired location is locked and processor 16 waits some time before executing a repeat swap operation at 120. If, at 122, the swap operation read of the desired memory location returns a value other than the lock value (for instance, logic zero), the swap operation read was successfully completed and processor 16 moves to 124 to read the contents of a(ix(i)). Processor 16 then moves to 126 and performs the desired operations on a(ix(i)). After the operation, processor 16, at 128, writes the result of the operations to a(ix(i)) as a simple write operation and, at 130, clears the lock value, freeing up access to a(ix(i)) to other processors 16. The steps illustrated in FIG. 3 could be implemented as program code in local memory 18 associated with a particular processor 16. As in FIG. 2, it should be obvious that, lacking any arbitration of swap operation requests, accesses to the hash table memory location occur on a first come, first served basis.

A compiler, suitable for use in situations where it is impossible to select a lock value which will not occur in normal operations on the element to be updated, can be constructed which automatically replaces code of an iterative loop with atomic update code of the form:

```
do i = 1, n
    do
        temp = atomic_swap(lock(hash(ix(i))), 1)
    while (temp .eq. 1)
    a(ix(i)) = a(ix(i)) <op> <expr>
    lock(hash(ix(i))) = 0
enddo
```

It should be noted that, depending on the architecture of system 10, system 10 may need to include a synchronization mechanism to ensure that the store of a zero to 'lock(hash-(ix(i)))' at 130 does not complete before the store to 'a(ix(i))' at 128.

Figure 4:
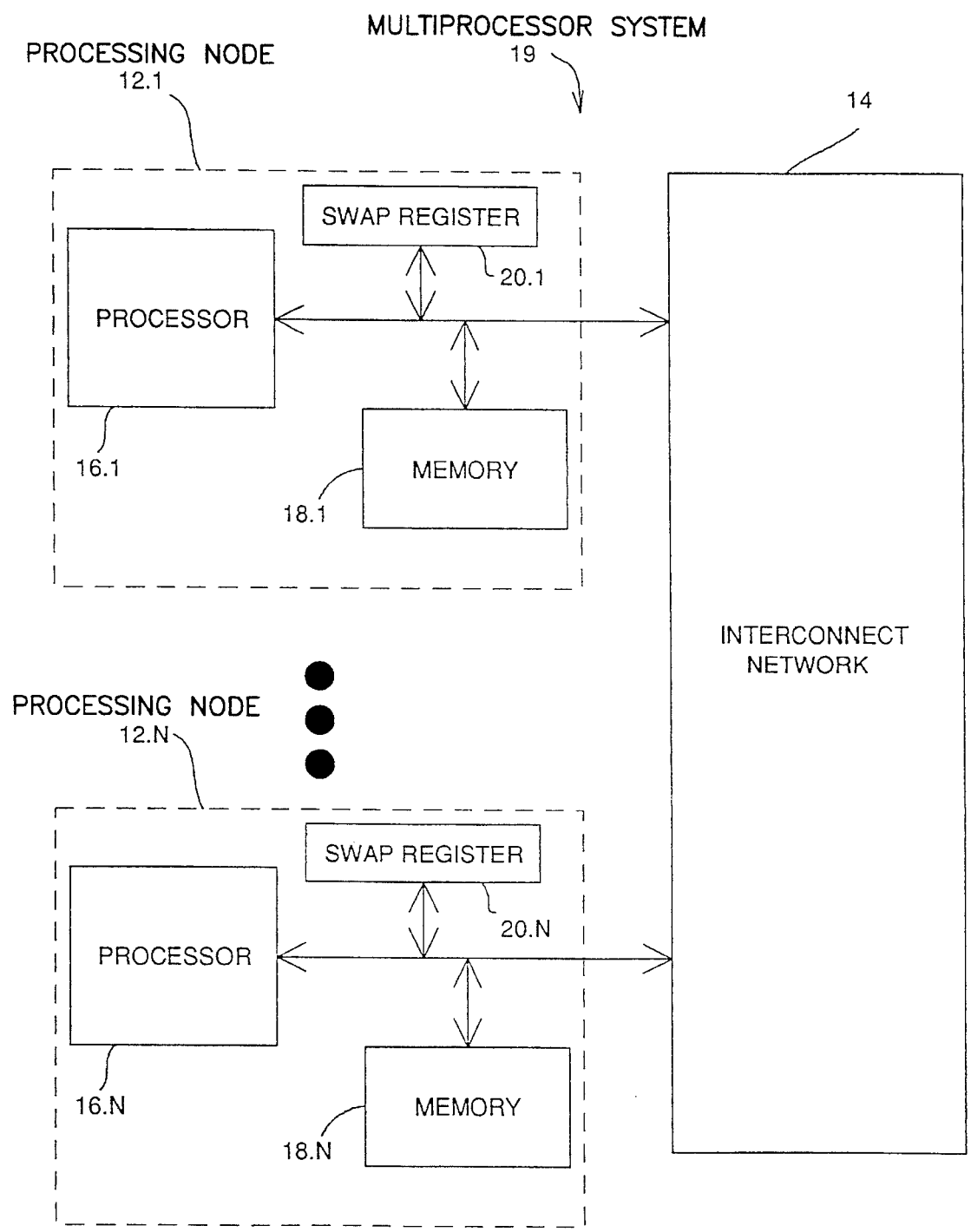
FIG. 4 a functional block diagram of an alternate embodiment of the multiprocessing system of FIG. 1.

As noted above, the atomic update method can be implemented in processors which do not support a swap instruction in the architecture or instruction set. In such processors, as can be seen in system 19 of FIG. 4, the swap function is implemented in an external memory-mapped register 20 and the operation is initiated by load instructions from specially marked pages of memory. In FIG. 4, swap register 20 is formed from an external 64-bit memory-mapped register. Each processor 16 has its own independent local swap register 20; the contents of that swap register 20 are written into a memory location during a swap operation by that processor 16. In one such embodiment, each register 20 is mapped to a memory page with user-level access permission.

Prior to performing a swap operation, swap register 20 is initialized to some value by a 64-bit store to the swap register memory-mapped location. From that point the value stored in swap register 20 is held until written over by processor 16. In one such embodiment, swap register 20 can only be written. In such an embodiment, the contents can, however, be read by performing a swap operation to a local memory location and subsequently reading the local memory location. It should be noted that the width of swap register 20 is not important; registers having other bit widths can be used to form swap register 20.

Figure 5:
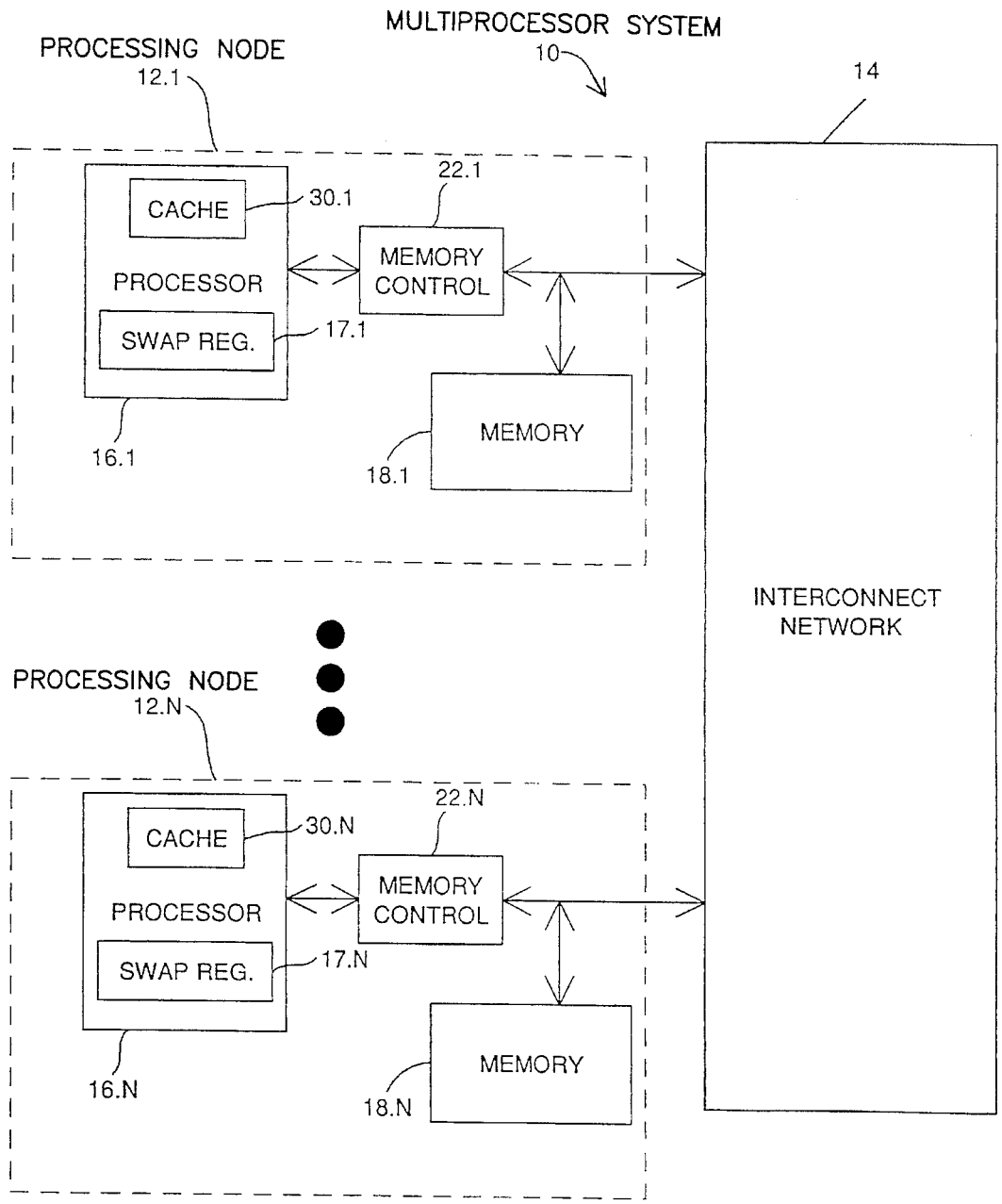
FIG. 5 is a functional block diagram of an embodiment of the multiprocessing system of FIG. 1 in which processors have integrated caches.

In one embodiment, such as is shown in FIG. 5, a swap operation is distinguished from a normal load operation by a value established in a memory function code stored in memory control hardware 22 external to each processor 16. In one such embodiment, a memory function code is associated with pages of global memory and setting the function code for a particular memory page equal to a "one" activates the swap operation. Once this code has been set in memory control hardware 22 for a particular processor 16, any loads by that processor 16 from addresses in that particular page of memory will be interpreted by the external memory control hardware 22 to be a swap operation. The contents of swap register 17 will then be sent to the target remote node 12 to be written into the desired memory location, and the pre-swap value of that memory location will be returned to the requesting processor 16. Subsequent loads by that processor 16 from that page will continue to be interpreted as swap operations until the memory function code for that particular page of memory is changed.

It should be noted that the atomic update method can be used advantageously not only in a multiprocessor system such as that illustrated in FIGS. 1 and 4 but also in a single processor system running multiple processes.

In processors 16 with integral caches 30 (as can be seen in FIG. 5), swap operations to local memory 18 in a processor node 12 can be cached. (Since it would be difficult to snoop memory accesses to remote memories 16, caching of swap operations to remote memory is not recommended.) The cached swap operation operates the same as a non-cached swap. The only difference is that external memory control hardware 22 for a particular processor 16 tells that processor 16 to place the return memory data in its on-chip data cache 30.

The purpose of the cached swap operation is to reduce local memory bank traffic generated by repeated swap operations by the local memory 18 (the spin-wait loop) while waiting for a remote processor 16 to store needed data into local memory 18. Because of the short latency seen by a processor 16 as it queries its local memory 18, repetitively issuing swap operations locally while waiting for another processor 16 to unlock a desired memory location can consume a significant amount of memory bandwidth. By enabling cached swaps, only the first swap actually accesses the local memory. Subsequent passes through the spin-wait loop will hit in the internal cache instead of cycling the memory bank. Meanwhile, any externally generated write by a remote processor 16, including the write to the desired memory location, will invalidate a cache line within cache 30. Whenever an external write coincides with the cache line being tested in the spin-wait loop, the invalidation will cause the local processor 16 to miss the cache and perform an external swap cycle to local memory 18, satisfying the spin-wait test.

There are several dangers to using cached swaps even for local swap operations. For instance, if a cached swap spin-wait loop is initiated by a local processor 16 within its node 12, there may never be any external stimuli that would invalidate the cache line associated with the swap destination. Local processor 16 would then spin forever on its on-chip cache. In addition, if a cached swap spin-wait loop is initiated to local memory 18, but the cache snooping function is not enabled (to look at accesses to local memory 18 by other than local processor 16), the processor 16 may never detect the external write to the cached memory location and will, therefore, remain inside its loop forever. Finally, if the cache line is not intentionally invalidated before use and the external write intended to break the spin-wait cycle has already occurred, processor 16 may hit the cache the first time through the spin-wait loop instead of performing an initial swap operation to the memory location in memory 18, preventing it from ever observing the terminating condition of the spin-wait loop. In one embodiment, a hardware deadman timer is used to terminate infinite loops caused by such things as a failure by local processor 16 to see removal of the lock.

It is clear that the methods of synchronizing described provide a flexible, efficient mechanism for synchronizing access to shared data memory locations. This application is intended to cover any adaptations or variations of the present invention and is therefore limited only by the claims or equivalents thereof.

What is claimed is:

1. A computer system, comprising:

an interconnect network; and a plurality of processing nodes, wherein the plurality of processing nodes includes a first processing node, wherein each of the plurality of processing nodes are connected to the first processing node through said interconnect network and wherein each processing node comprises:

a memory having a plurality of memory locations, including a first memory location;

a local swap register; and processing means for operating on data stored in the first memory location of said first processing node, wherein the processing means performs an atomic swap operation in which data stored in the first memory location of said first processing node is transferred to the processing means and a lock value stored in the local swap register is stored in said first memory location.

2. In a computer system having a plurality of processor nodes connected through an interconnect network, wherein the plurality of processor nodes includes first and second processor nodes and wherein each processor node includes a local swap register for storing a lock value, a method of protecting data stored on the first processor node when that data is being accessed by a process on said second processor node, the method comprising the steps of:

a) defining a lock value;

b) writing the lock value in the local swap register of the second processor node;

c) providing a hash table having a plurality of hash table cells, including a first hash table cell, wherein the first hash table cell contains a lock entry for a protected memory location;

d) selecting said first hash table cell from the plurality of hash table cells, wherein the step of selecting comprises calculating a hash value;

e) reading the lock entry at the selected first hash table cell, wherein the step of reading the lock entry comprises the step of atomically swapping the lock value stored in the local swap register of the second processor node with the lock entry at the selected first hash table cell;

f) comparing the lock entry read from the selected first hash table cell to the defined lock value; and g) if the lock entry read does equal the defined lock value, repeating steps e–g.

3. The method according to claim 2 wherein the step of reading comprises storing the lock entry read from the selected hash table cell in a cache.

4. The method according to claim 2 wherein the method further comprises the step of:

h) if the lock entry read from the selected first hash table cell does not equal the defined lock value, accessing the protected memory location.

5. The method according to claim 4 wherein the step of repeating comprises waiting a period of time before executing step e.

* * * * *